C. D. GALLOWAY, Jr.
ELECTRIC BATTERY.
APPLICATION FILED FEB. 1, 1912.
1,035,178.
Patented Aug. 13, 1912.
Fig. 1.
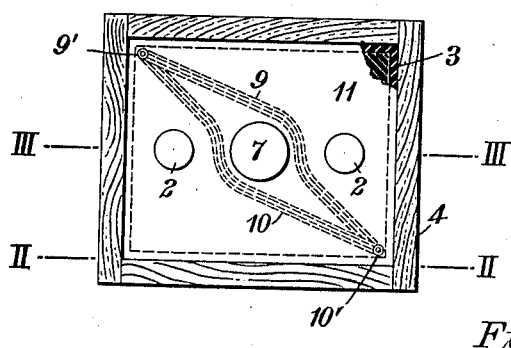
Fig. 4.
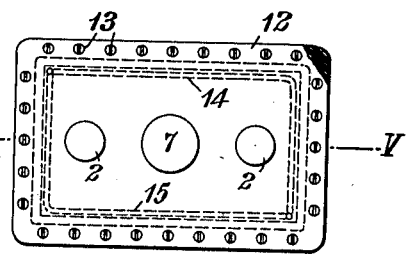
Fig. 2.
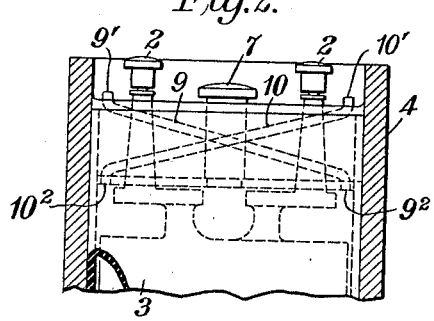
Fig. 6.
Fig. 5.
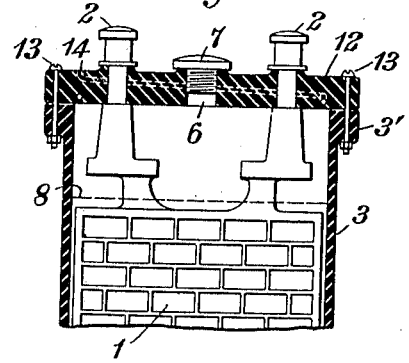
Fig. 3.
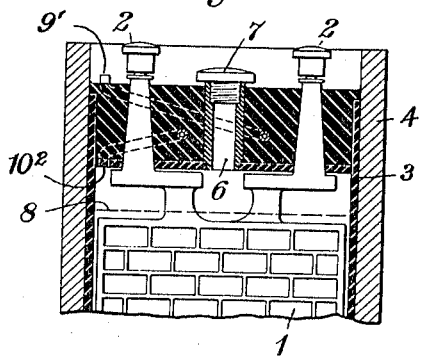
Fig. 7.
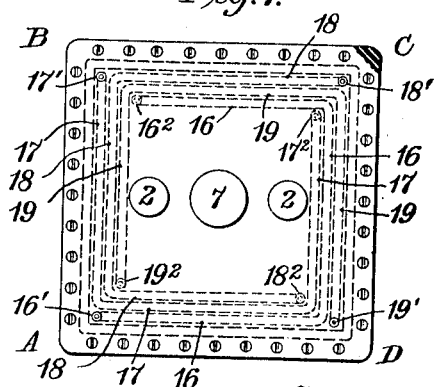
Witnesses:
C. L. Belcher
L. L. Browning
Inventor
Charles D. Galloway Jr.
By his Attorney
Edward C. Davidson

UNITED STATES PATENT OFFICE.

CHARLES D. GALLOWAY, JR., OF ELIZABETH, NEW JERSEY.

ELECTRIC BATTERY.

1,035,178.  Specification of Letters Patent.  Patented Aug. 13, 1912.

Application filed February 1, 1912. Serial No. 674,676.

*To all whom it may concern:*

Be it known that I, CHARLES D. GALLOWAY, Jr., residing in Elizabeth, county of Union, State of New Jersey, a citizen of the United States of America, have invented certain new and useful improvements in Electric Batteries, of which the following is a specification.

This invention relates primarily to secondary batteries and provides a vent therefor that makes it permissible to place the battery in various positions without danger of leakage.

In the accompanying drawing: Figure 1 is a plan view partly broken away to indicate parts composed of insulating material: Fig. 2, a section on the line II, II of Fig. 1: Fig. 3, a section on the line III, III of Fig. 1: Fig. 4, a plan showing a battery of slightly modified construction: Fig. 5, a section of the line V, V, of Fig. 4: Fig. 6, a side elevation of the cover of the cell: and Fig. 7 a diagrammatic plan view showing a modification.

Referring to Figs. 1 to 6, in all views 1 indicates the ordinary lead grids or electrodes and 2, 2, the terminals or binding posts. 3 is the ordinary vulcanite or other suitable cell inclosed as usual in a wooden jacket 4.

In the construction shown in Figs. 1, 2 and 3, the cell is provided with the ordinary plug closure cast in the mouth thereof and having through it the usual aperture 6. This aperture, however, in the present instance, is closed by a solid screw plug 7 without any provision for venting the battery at this point. The dotted line 8 indicates the level of the electrolyte when the cell is standing upright upon its bottom.

The means for venting the cell are as follows: Inclosed in the plug closure, cast therein, are two vent pipes. One of them 9 opens upwardly to the atmosphere at 9', at one of the corners of the cell, and then extends diagonally with a falling pitch to the opposite corner of the cell and opens at 9² through the bottom of the plug cover to the gas space of the cell. The companion vent pipe 10 is reversely arranged; that is to say, it opens upwardly to the atmosphere at 10' at the same corner of the cell at which the end 9² of the other vent passage opens downwardly to the gas space and then extends diagonally with falling pitch to the opposite corner of the cell and opens at 10² to the gas space of the cell at the same corner thereof as the vent end 9' of the other pipe or passage is located. These oppositely disposed vent tubes or passages are curved away from each other at their central portions so as to pass respectively on opposite sides of the aperture 6. If the filling aperture 6 were located elsewhere than in the center of the top of the cell as, for instance, at one side, as at 11 (Fig. 1), the vent tubes or passages 9, 10, could extend in straight lines directly from one corner of the cell to the other. This arrangement of venting means makes it permissible, as will be obvious, for the cell to be laid upon either of its four sides,—that is to say, under any conditions of use, it may assume any angle except one amounting substantially to inversion without danger of leakage. The vent tubes need only be of very small cross sectional area and are preferably given some pitch. It is found in practice that there is no danger of leakage caused by jostling or shaking of the cell in any of its positions.

Figs. 4, 5 and 6 show a style of cell somewhat different in form but not in principle from that already described. The cell 3 is formed with a flange 3' around its upper edge upon which rests a cover plate 12 secured to the flange by bolts 13. In this instance, the oppositely arranged vent passages 14, 15 are formed in the cover 12 and with respect to their openings to the atmosphere and the gas space of the cell are exactly as already described. The only distinction over the construction shown in Fig. 1 is that the vent tubes or passages instead of extending diagonally from one corner of the cover to the other, are respectively carried along the cover adjacent its sides making one turn at right angles.

The location of the openings to the atmosphere and to the gas space should preferably be as near as possible at what may be called the corners of the cell because when the cell is laid upon its side the opening to the gas space is farthest removed from the level of the electrolyte.

Fig. 7 illustrates a modification, or rather an extension, of the invention that makes it permissible to place the cell in any position other than upside down without leakage through the vents. In this construction there are shown four vent tubes or passages marked 16, 17, 18 and 19. The passage 16 opens to the atmosphere at 16' at one corner or angle of the cell marked A from whence it extends along three sides of the cell (or its cover or closure) and opens to the gas space at 16² at the adjacent corner B. A similarly arranged passage 17 opens to the atmosphere at 17' at the corner B and to the gas space at 17² at corner C; another 18 opens to the atmosphere at 18' at corner C and to the gas space at 18² at corner D; and another 19 opens to the atmosphere at 19' at corner D and to the gas space at 19² at corner A. This figure of drawing is diagrammatic in that in practice the openings of each passage will be as nearly as possible at the corners. It would be very difficult to show the openings of the various passages one overlying another. The passages between its ends may be disposed in any way that does not permit a direct fall for the electrolyte from the gas end to the atmosphere end.

The invention is applicable to cells other than those square or rectangular in cross section. For instance if the cell shown in Fig. 7 be circular the points called corners may be points located equi-distant from each other and the passages be disposed in circular or curved lines. In the case of a circular cell the use of proportionately less electrolyte would be permissible.

I claim:

1. A battery vent disposed in the cover or closure of the cell and comprising oppositely arranged vent tubes or passages one of which opens to the atmosphere at or adjacent one corner of the cell and to the gas space of the cell at the diagonally opposite corner and the other of which opens to the atmosphere at the latter corner of the cell and to the gas space at the diagonally opposite corner.

2. A battery vent comprising oppositely arranged vent tubes or passages one of which opens to the atmosphere at or adjacent one corner of the cell and to the gas space of the cell at the diagonally opposite corner and the other of which opens to the atmosphere at the latter corner of the cell and to the gas space at the diagonally opposite corner.

3. A battery vent comprising a plurality of vent passages each of which opens at one end to the atmosphere and at the other end to the gas space of the cell, the several openings to the atmosphere being symmetrically spaced around the cell and the several openings to the gas space being also symmetrically disposed around the cell.

4. A battery vent comprising a plurality of vent passages each of which opens at one end to the atmosphere and at the other to the gas space, the several passages being disposed transversely with respect to the vertical axis of the cell in such manner that leakage of electrolyte will not occur when the cell is placed in lateral position.

In testimony whereof, I have hereunto subscribed my name.

CHARLES D. GALLOWAY, Jr.

Witnesses:
S. A. STORY,
L. F. BROWNING.